Feb. 19, 1952　　　G. STEWART　　　2,586,183
TURNING MACHINE

Filed Dec. 29, 1945　　　　　　　　　6 Sheets-Sheet 1

INVENTOR.
Gilbert Stewart
BY
Carlson, Pitzner, Hubbard & Wolfe
Attys.

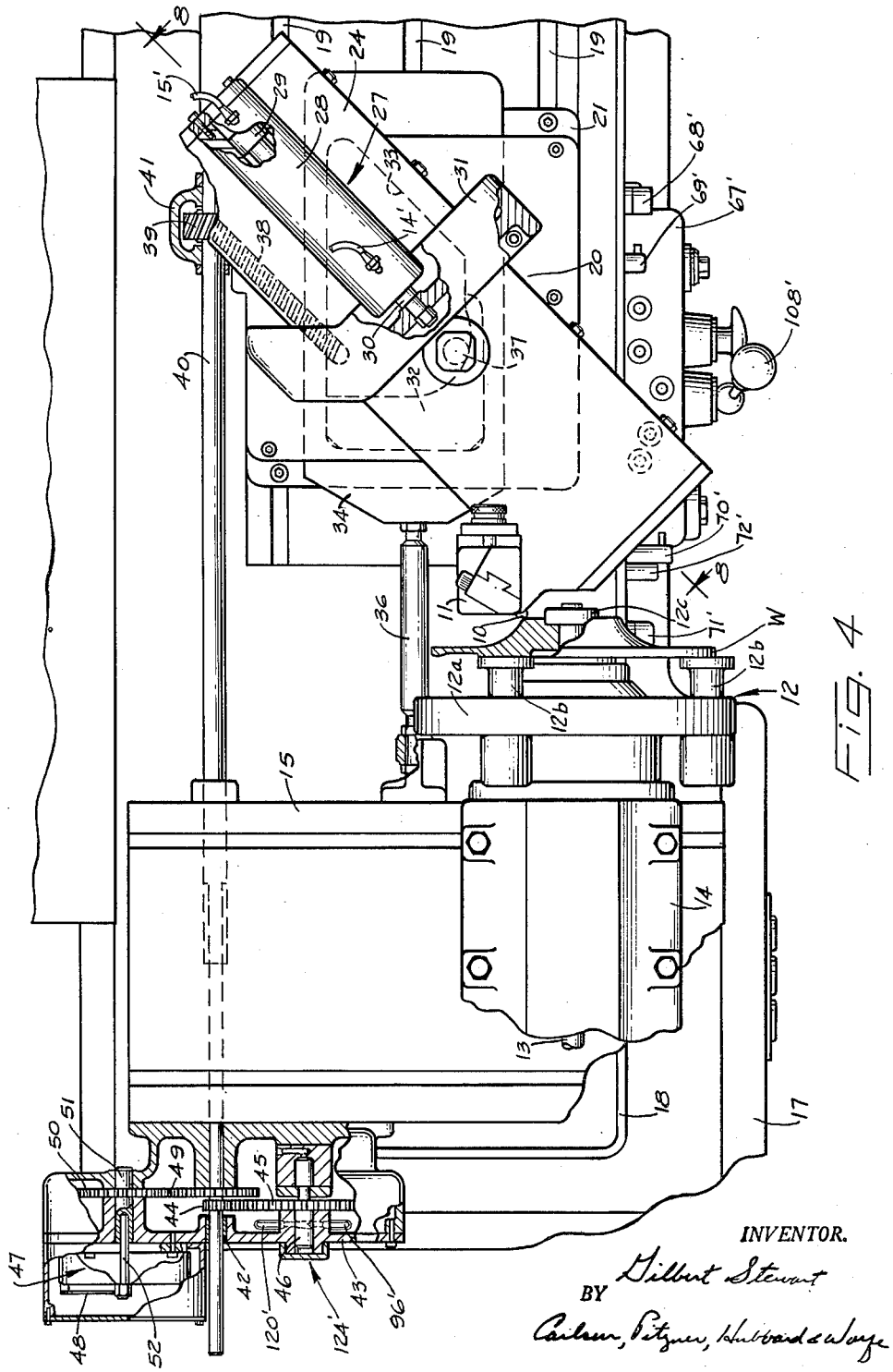

Feb. 19, 1952 G. STEWART 2,586,183
TURNING MACHINE
Filed Dec. 29, 1945 6 Sheets-Sheet 5
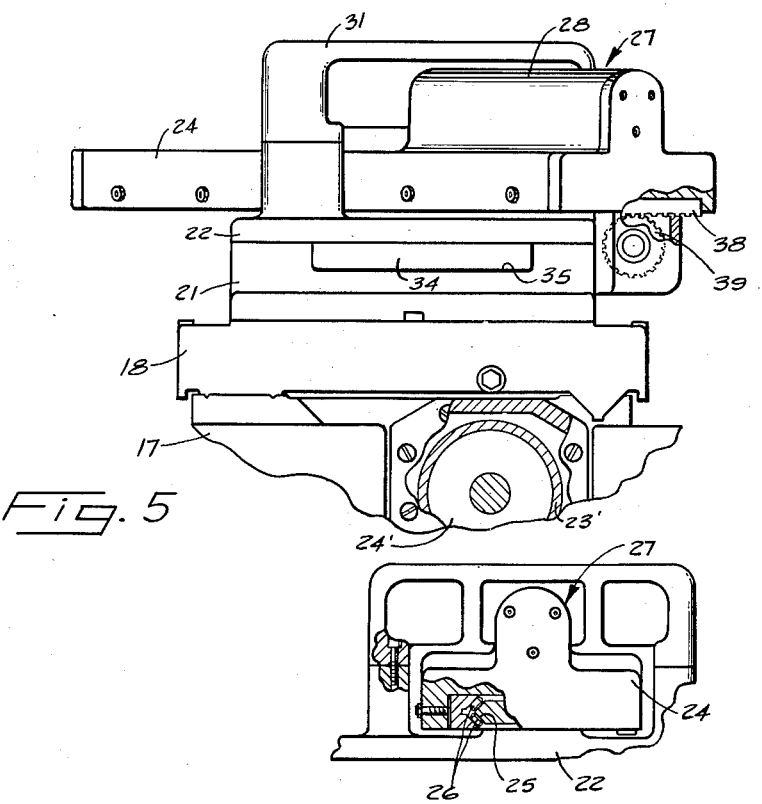
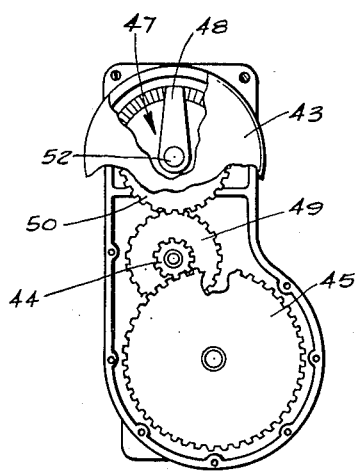
INVENTOR.
Gilbert Stewart
BY
Carlson, Pitzner, Hubbard & George Feb. 19, 1952 G. STEWART 2,586,183
TURNING MACHINE
Filed Dec. 29, 1945 6 Sheets-Sheet 6

INVENTOR.
Gilbert Stewart
BY
Carlson, Pitzner, Hubbard & Wege

Patented Feb. 19, 1952

2,586,183

UNITED STATES PATENT OFFICE 2,586,183

TURNING MACHINE

Gilbert Stewart, Detroit, Mich., assignor to Ex-Cell-O Corporation, Detroit, Mich., a corporation of Michigan Application December 29, 1945, Serial No. 638,198

3 Claims. (Cl. 82—14)

The present invention pertains to machine tools for performing turning operations.

The general aim of the invention is to improve the surface finish produced in turning workpieces of curved or similarly irregular profile.

More particularly, it is an object of the invention to provide a turning machine embodying a novel arrangement for automatically maintaining not only a substantially constant peripheral speed of the work in reference to the tool, but also a substantially constant rate of tool feed along the workpiece profile, in turning workpieces of curved or similarly irregular profile.

A further object is to provide a fixture applicable to a more or less standard form of turning machine to accommodate attainment of the speed relations set out above.

The invention also resides in various structural improvements and novel combinations of elements by means of which the foregoing objectives are achieved in a simple and economical manner.

Further objects and advantages of the invention will become apparent as the following description proceeds taken in conjunction with the accompanying drawings in which:

Fig. 4 is a fragmentary plan view of the machine of Fig. 1.

Fig. 5 is a partial end elevation of the machine in Fig. 1, being taken from the right end.

Fig. 6 is a rear end elevation, partially in section, of the tool supporting slide and associated parts included in the machine of Fig. 1.

Fig. 7 is an enlarged detail end elevation, with a portion of the casing structure broken away, of the rheostat and its operating mechanism mounted on the left end of the machine.

Figure 1:
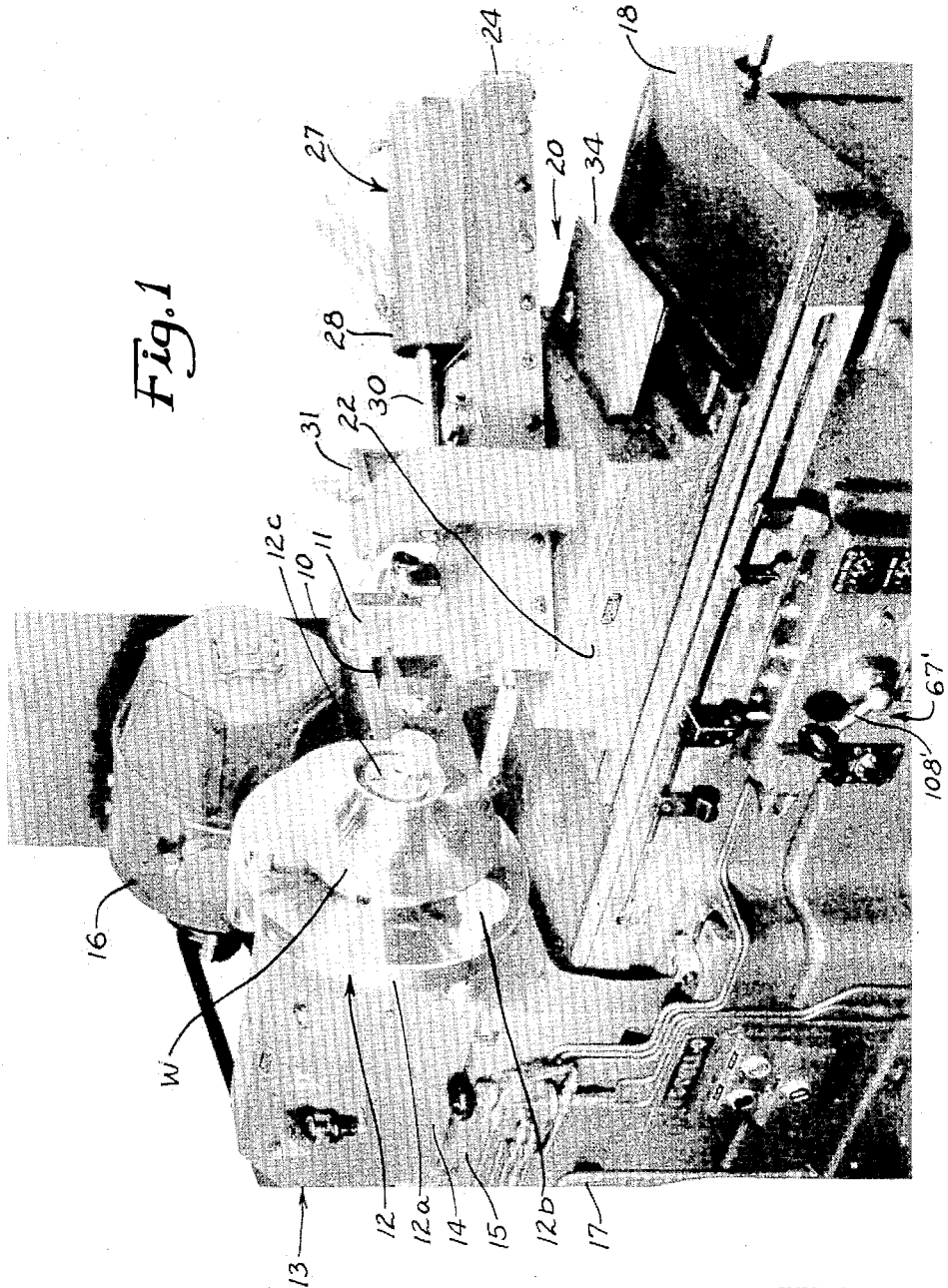
Figure 1 is a perspective view, taken from the front side, of an upper portion of a turning machine embodying the present invention.
Figure 2:
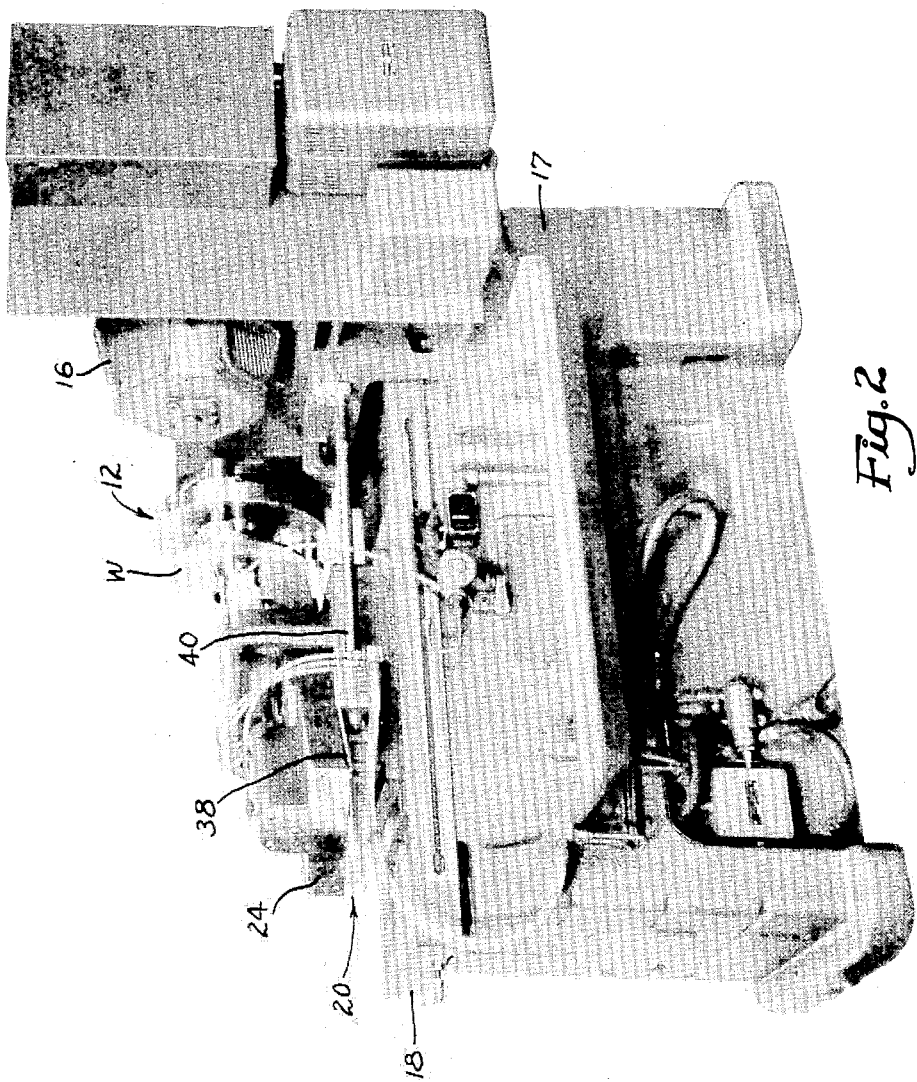
Fig. 2 is a perspective view of the machine of Fig. 1, but taken from the rear side.

Although a particular embodiment of the invention has been illustrated and described in some detail, there is no intention to thereby limit the invention to such embodiment, but on the other hand, I intend to cover all modifications and alternative constructions falling within the spirit and scope of the invention as expressed in the appended claims.

Referring more particularly to the exemplary embodiment of the invention illustrated herein, the same has been shown as incorporated in a turning machine arranged, in this instance, for turning a workpiece W. The latter may be, for example, a portion of a hydraulic coupling and presents an exterior which is a surface of revolution about its longitudinal axis, the profile curve of such surface being generally hyperbolic in form. The turning of such surface is accomplished by a turning tool 10 mounted in a suitable tool holder 11, the work being revolved about its axis and the tool moved to generate the desired surface contour on it.

In the instant machine the workpiece W is fixed in a chuck, designated generally as 12, carried on the forward end of a spindle 13. Such spindle is rotatably mounted in a suitable housing 14 adjustably secured to a bridge 15 and is driven by a belt connected electric motor 16. The spindle rotates counterclockwise (as viewed from the chuck end) and the turning tool 10 is located to the rear of the machine to contact the upwardly moving portion of the workpiece surface along a horizontal line passing diametrically across the work. The chuck 12 itself includes a face plate 12a fixed on the spindle and carrying locating studs 12b against which the workpiece W is held by a retainer 12c (Fig. 4).

The bridge 15 is rigidly mounted on the base 17 of the machine and is arranged to straddle a table 18 which is slidably mounted on suitable horizontal ways 19 on the base for endwise reciprocation. The table 18 is reciprocated by a suitable variable speed transmission which may, for example, be a hydraulic transmission of precisely the form disclosed in M. A. Mathys Patent No. 2,368,259 issued January 30, 1945. Consequently, detailing here is unnecessary. For present purposes it is requisite that the transmission be such that it will afford an automatic cycle of reciprocation for the table and include an adjustment element for varying the feed speed of the table. As here shown the table 18 is reciprocated by an actuator comprising a cylinder 23' and piston 24' corresponding to the cylinder and piston 23, 24 of said Mathys patent. Suitable valve mechanism for controlling such actuator is incorporated in a panel 67' on the front of the machine base, the valve mechanism being controlled by a manual starting lever 108' and a series of dogs 68', 69', 70', 71' and 72' adjustably fixed to the front edge of the table 18. All reference numerals in this present application which have a prime mark appended designate parts which are identical with the correlatively numbered parts of the transmission shown in said Mathys patent and to which reference may be made for further detail of the same and of the remainder of the transmission.

For present purposes suffice it to say that upon shifting the manual starting lever 108' the table 18 is caused to execute automatically a cycle of operation which begins with a rapid approach movement of the table (to the left) and in the course of which the tool 10 is approached to the work. This approach movement is followed by a slower feed movement of the table in the same direction and during which the workpiece is machined. Finally the table is retracted at a rapid return rate to its starting position where it comes to rest. The only alteration made in the hydraulic transmission disclosed in said Mathys patent in accommodating the same for the present machine is that the manually adjustable feed control orifice 124 of said patent is replaced by a like orifice 124' (Fig. 4) herein which is adapted to be automatically adjusted in course of the machine cycle to afford a requisite relation of speeds hereinafter detailed. In the present instance pressure fluid (oil) is conveyed to and from the orifice 124' through conduits 96' and 120' leading from the passages in the main panel 67' to which the orifice 124 in said Mathys patent is connected.

Fixed to the table 18 is a tool supporting fixture, designated generally as 20, and which is adapted, in conjunction with the movement of the table, to impart the bodily movements to the tool 10 requisite for generating the desired surface on the workpiece W. In the illustrated embodiment such fixture includes a generally rectangular base 21 to which is fixed top plate 22 separated therefrom by spacers 23. On the top plate 22 is a slide 24 movable endwise along laterally facing guides 25 (Fig. 6) fixed to the top plate 22 and arranged at an angle of 45 degrees with reference to the axis of table travel. The slide 24 rides along the guides on anti-friction rollers 26.

Figure 3:
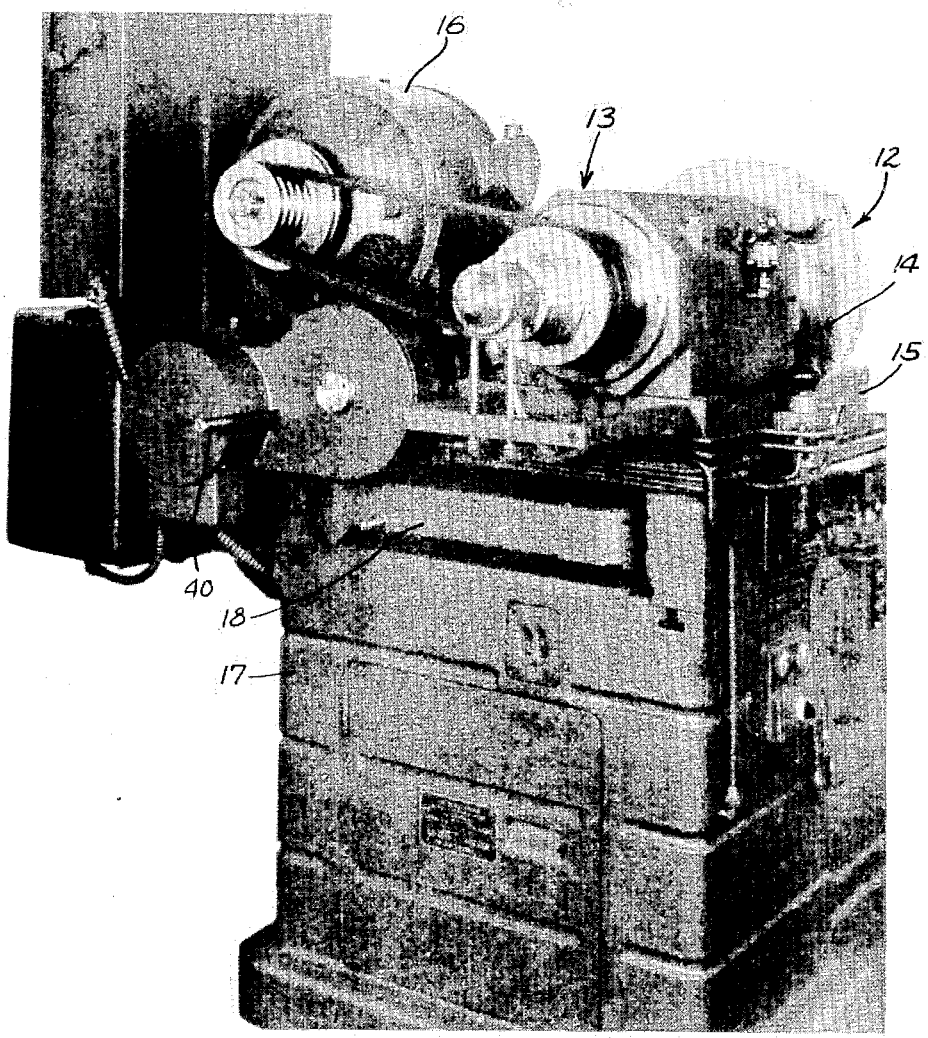
Fig. 3 is a perspective view of the machine of Fig. 1, but taken from the left end.
Figure 8:
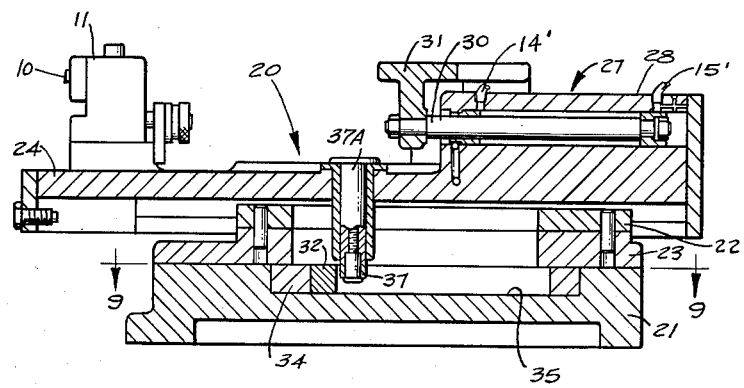
Fig. 8 is a sectional view taken substantially along the line 8—8 of Fig. 4.

An auxiliary hydraulic actuator 27 (Figs. 4 and 8) is provided for moving the slide 24. Such actuator comprises a cylinder 28 fixed to the slide and having slidable in it a piston 29, whose piston rod 30 is fixed to a bracket 31 rigid with the fixture top plate 22 and straddling the slide 24. Fluid is supplied to respective opposite ends of the cylinder 28 through flexible conduits 14', 15'. Such conduits may be branched from the conduits 14, 15 shown in Fig. 3 of said Mathys Patent 2,368,259 and thus serve to place the actuator 27 hereof in the system at such point as to afford operation of the actuator in course of the machine cycle in a manner which will shortly appear.

The actuators for moving both the table 18 and slide 24 are somewhat impositive in character by reason of the fact that both are hydraulic. In other words, being hydraulic actuators they do not afford an absolutely positive control of tool location at all times. In the present instance, however, they are coordinated with a cam mechanism in such manner as to accomplish positively controlled location of the tool at all times during cutting, and hence to insure precise contouring of the work.

Figure 9:
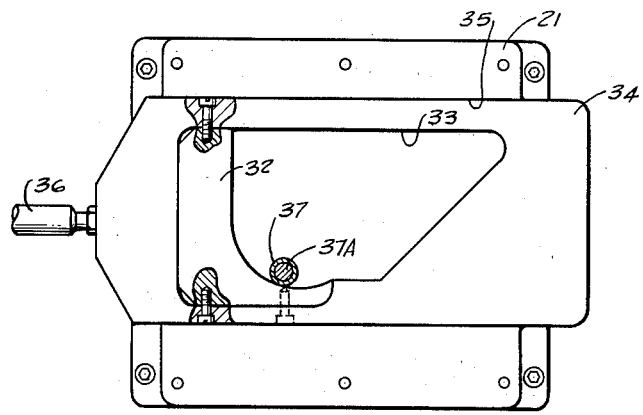
Fig. 9 is a detail sectional view taken substantially along the line 9—9 of Fig. 8.

In the illustrative machine, such cam mechanism includes an edge cam 32 mounted in (see Fig. 9) an opening 33 in a stationary supporting plate 34. Such plate projects through a notch 35 in the top of the fixture base 21 (Figs. 5, 8 and 9) and is rigidly secured to the stationary machine bridge 15 by a rod 36 (Fig. 4). As the table 18 reciprocates, the fixture 20 moves back and forth longitudinally of the cam supporting plate 34, the latter moving slidably through the notch 35 in the fixture base.

A cam follower roller 37 (Figs. 4 and 8) arranged beneath the angular slide 24, and journalled on the lower end of a pin 37A depending therefrom, rides along the edge cam 32. Throughout the cutting portion of the machine cycle the auxiliary actuator 27 urges the slide 24 constantly forward, retaining the follower 37 in contact with the cam 32. The shape of the latter is determined in accordance with the shape of the surface to be generated in the workpiece. The shape of the cam and profile of the work match each other exactly only in the unlikely event that the nose of the tool has the same radius as the cam follower roller 37. Otherwise the contour of the cam is modified, in reference to the work profile to be generated, in accordance with the disparity between the radii of the tool nose and cam follower roller.

It will be perceived that, assuming both the table 18 and fixture slide 24 to be advancing, the resultant velocity of motion of the tool 10 may be resolved into two vectorial components respectively related to the work axis, one component being transverse and the other longitudinal of such axis. The motion of the slide 24 may, on the other hand, also be resolved into two components also respectively transverse and longitudinal of such axis, the latter two components being equal since the slide moves at an angle of 45 degrees to the table path. Of the two components of slide movement, the transverse one constitutes the transverse component of tool movement in its entirety. The longitudinal component of tool movement is, on the other hand, the algebraic sum of the velocity of table travel and longitudinal component of slide velocity.

Such resolution of the velocity components is useful in analyzing the control of velocity for the tool with reference to the work which is, in accordance with certain aspects of the present invention, achieved herein. Two primary conditions are sought to be fulfilled as regards velocity of the tool with reference to the work. One is that the tool shall advance at a substantially constant rate along the profile of the work. The other is that the peripheral speed of the work surface with reference to the tool shall remain substantially constant. The first of these two conditions is fulfilled by automatically adjusting the speed of table feed and hence the longitudinal component of tool velocity which, as heretofore noted, is derived in part from table motion. The second condition is fulfilled by automatically adjusting the rate of work rotation. Both such adjustments are accomplished herein in accordance with the displacement of the fixture slide 24 along its angular path and through the use of mechanism which will next be described.

It is to maintain the described constancy of movement of the tool 10 along the profile of the work that the feed orifice 124', heretofore mentioned, is automatically adjusted by positionable control means. For that purpose a rack 38 (Figs. 4 and 5) is fixed to the underside of the slide 24 and meshed with a skew pinion 39. Such pinion turns a shaft 40 journalled at its opposite ends in a housing 41 on the side of the fixture base 21 and suitable bearing 42 within a housing 43 fixed to the outer end of the bridge 15. Splined on the shaft 40 is a pinion 44 meshed with a gear 45. The latter gear is fixed to the rotatably adjustable plug 46 of the orifice 124' and whose angular position determines the size of the opening afforded by the orifice.

Also driven from the shaft 40 is a suitable mechanism for adjusting the speed of the spindle drive motor 16. In the present instance the speed adjusting mechanism comprises a rheostat 47 (Fig. 4) and which may, for example, be connected in series with the motor's field winding (not shown) in the usual manner. By turning rotatable contact arm 48 of the rheostat the motor speed is correspondingly altered. For that purpose a gear 49, compounded with the pinion 44, is meshed with a gear 50 fast on a shaft 51 which is fixed to the operating shaft 52 of the rheostat contact 48.

It will be seen that as the fixture slide 24 moves along its angular path, the rack 38 turns the pinion 39, thereby varying both the tabel speed, through the agency of the orifice 124', and the speed of spindle rotation, via the rheostat 47.

Assuming a workpiece W to be in place in the chuck 12 and the table 18 and fixture slide 24 to be in their retracted or starting positions, the operator initiates a cycle of operation by throwing the hand lever 108' to starting position. Thereupon, the table 18 is advanced at a rapid traverse rate toward the work and the spindle drive motor 16 automatically started. Coincidentally with the starting of the spindle motor admission of pressure fluid to the line 15' takes place, thus causing the actuator 27 to advance the fixture slide 24 and bring the follower 37 into contact with the cam 32.

The rapid approach movement of the table is terminated by the action of the dog 72' on a suitable feed control valve (not shown) in the panel 67', whereupon advance of the table continues but at a slow or feed rate determined by the setting of the orifice 124'. For details of the valve mechanisms and their action which take place in the hydraulic transmission indicated for the table see the Mathys Patent 2,368,259 previously identified.

In the course of the forward feed motion of the table 18 the tool 10 contacts the revolving workpiece W, generating or turning a contoured surface thereon. Such contour is determined by the shape of the cam 32 for, as the follower 37 rides along the latter, movement of the slide 24 endwise along its ways is positively controlled by the cam.

As to the action of the cam 32 in controlling the contour of the surface generated on the workpiece W, it will be perceived that with the machine parts arranged as described the cam positively controls the lateral displacement of the tool in timed relation with the movement of the tool longitudinally of the work.

In machining the particular workpiece which is illustrated, the advance of the table 18 causes the cam follower 37 to roll along the stationary cam 32 and the latter is shaped so as to thrust the slide 24 rearwardly against the pressure of the fluid applied through the line 15'. Consequently, fluid is actually expelled through the line 15' during this period. Such retracting motion of the slide 24 results in the lateral displacement of the tool relative to the work so that the desired shape is generated on the latter.

Incident to the motion of the slide 24, the skew pinion 39 is revolved by the rack 38 in proportion to the displacement of the slide. As heretofore detailed, the turning of the pinion 39 is used to adjust the setting of the table speed control orifice 124' and of the spindle drive motor rheostat 47. The table 18 is thus progressively slowed down as the tool 10 is shifted laterally of the work axis so that the movement of the tool along the profile of the work remains substantially constant in speed. Moreover, it is to be noted that some forward motion of the table is permitted even during generation of that portion of the workpiece surface which is normal to the path of table travel. The latter result is made possible by the subtractive effect of the slide motion, the latter having a component at such time which is opposite to the forward travel of the table. As the radius of turning increases the spindle drive motor is progressively slowed down so that the peripheral speed of the portion of the workpiece under the turning tool remains substantially constant.

At the completion of the turning operation the controls on the panel 67' are automatically actuated to reverse the table 18 at a rapid rate back to its starting position and the spindle motor 16 stopped. Coincident with such stoppage of the spindle motor the fluid connections to the auxiliary actuator 27 are reversed, restoring the slide 24 to its starting position.

I claim as my invention:

1. A turning machine comprising the combination of a base, a rotatable work support thereon, a motor for rotating said support, a table reciprocable in parallelism with the rotational axis of said work support, hydraulic mechanism for reciprocating said table, a tool support slide mounted on the table and movable relative to the latter along a path lying at an acute angle to the path of table reciprocation, coacting cam and cam follower elements arranged with one of said elements fixed to said base and the other to said slide for effecting movement of said slide along said acute angle path in timed relation with the movement of said table, a rotatable shaft, a rack mounted on the slide, a pinion drivingly fixed to said shaft and disposed in meshing engagement with said rack, means including a driving gear having a splined connection with said rotatable shaft, motor control means drivingly connected to said driving gear for varying the rate of said motor and therefore the rotation of said work support in proportion to said lateral displacement of said slide to maintain substantially constant the peripheral speed of a workpiece relative to a tool, and a hydraulic control means also drivingly connected to said driving gear for simultaneously varying the rate of said hydraulic mechanism and therefore the rate of table travel in proportion to said lateral displacement of said slide to maintain substantially constant the rate of movement of said tool along the profile of the work.

2. A turning machine comprising the combination of a rotatable work supporting spindle, a motor for rotating said work supporting spindle, a table reciprocable in parallelism with the axis of rotation of said work supporting spindle, hydraulic mechanism for reciprocating said table, a tool slide mounted on said table for movement laterally of said axis and in a path lying at approximately 45° to said axis, coacting cam and cam follower elements arranged with one carried by said slide and the other rigidly fixed for effecting movement of said slide along its path in timed relation with the movement of said table, a rack fixed to said slide, a rotatable shaft, a skew pinion fixed to said shaft in meshing engagement with said rack, said shaft being positionable in accordance with the longitudinal movements of said slide along said 45° path, electrical control means including a rheostat drivingly connected to said shaft to vary the speed of rotation of said motor and therefore the speed of rotation of said work supporting spindle, and a rotatable adjustable hydraulic control orifice also drivingly connected to said shaft for varying the rate of said hydraulic mechanism and therefore the rate of table movement.

3. A turning machine comprising the combination of a rotatable work support, a motor for rotating said support, a table reciprocable in parallelism with the axis of rotation of said work support, hydraulic mechanism for reciprocating said table, a tool slide mounted on said table for movement laterally of said axis and in a path lying at approximately 45° to said axis, coacting cam and follower elements for positively controlling the displacement of said tool slide laterally of said axis in proportion to the displacement of said table longitudinally of said axis, a rack fixed to said slide, a shaft rotatable in accordance with the longitudinal movements of said slide along said 45° path, a first pinion fixed to said shaft and disposed in meshing engagement with said rack, a second pinion having a spline connection with said shaft, a motor control rheostat having a movable element driven through said second pinion for varying the speed of rotation of said motor and hence the speed of rotation of said work support, and a hydraulic control member for said table having a rotatable orifice plug also driven through said second pinion for varying the rate of said hydraulic mechanism and hence the rate of table movement.

GILBERT STEWART.

REFERENCES CITED

The following references are of record in the file of this patent:

UNITED STATES PATENTS

| Number | Name | Date |
|---|---|---|
| 798,391 | Clark | Aug. 29, 1905 |
| 1,166,126 | Gridley | Dec. 28, 1915 |
| 1,575,367 | Johnson | Mar. 2, 1926 |
| 1,933,224 | Smith | Oct. 31, 1933 |
| 2,368,259 | Mathys | Jan. 30, 1945 |
| 2,372,427 | Johnson | Mar. 27, 1945 |
| 2,401,422 | Hamilton | June 4, 1946 |
| 2,401,803 | Turchan | June 11, 1946 |
| 2,437,570 | Von Zelewsky | Mar. 9, 1948 |